United States Patent [19]

Lee

[11] Patent Number: 5,428,488

[45] Date of Patent: Jun. 27, 1995

[54] HEAD DRUM AND TAPE TRANSPORT DRIVING DEVICE FOR A VIDEO TAPE RECORDER

[75] Inventor: Min-Su Lee, Suwon, Rep. of Korea

[73] Assignee: Samsung Electronics Co., Ltd., Kuyungki, Rep. of Korea

[21] Appl. No.: 229,660

[22] Filed: Apr. 19, 1994

[30] Foreign Application Priority Data

Apr. 19, 1993 [KR] Rep. of Korea ............... 93-6573
Jul. 10, 1993 [KR] Rep. of Korea ............... 93-12986

[51] Int. Cl.⁶ ............................................. G11B 5/027
[52] U.S. Cl. ..................................... 360/84; 360/85
[58] Field of Search ................................. 360/85, 84

[56] References Cited

U.S. PATENT DOCUMENTS

| | | | |
|---|---|---|---|
| 4,594,624 | 6/1986 | Kanchiku et al. | 360/85 X |
| 4,620,245 | 10/1986 | Shimizu | 360/85 |
| 4,984,105 | 1/1991 | Hwang | 360/85 |
| 5,151,833 | 9/1992 | Nakanishi | 360/85 |
| 5,349,485 | 9/1994 | Lin et al. | 360/85 |

*Primary Examiner*—John H. Wolff
*Attorney, Agent, or Firm*—Sughrue, Mion, Zinn, Macpeak & Seas

[57] ABSTRACT

A head drum and tape transport driving device for a video tape recorder which can transport the magnetic tape by means of one motor used for driving the had drum. Supply and take-up reels are provided for supplying a data-recordable tape and winding up the same. A head drum carries a head for recording and/or reproducing data on or from the tape. A motor drives the head drum and a tape transport device transports the tape past the head drum. A first power transmission transfers motive power from the motor to tape transport device and a second power transmission selectively transfers motive power of the tape transport device to the supply reel or the take-up reel.

14 Claims, 7 Drawing Sheets

HEAD DRUM AND TAPE TRANSPORT DRIVING DEVICE FOR A VIDEO TAPE RECORDER

BACKGROUND OF THE INVENTION

1. Field of the Invention

The present invention relates to a video signal recording/reproducing apparatus equipped with a rotary head drum for recording or reproducing a video signal to or from a magnetic tape, and more particularly to a head drum and tape driving device of a video tape recorder (VTR) which can transport a magnetic tape by means of a single motor which is also used for driving the head drum.

2. Description of the Related Art

A conventional videocassette recorder (VCR) requires a motor for driving the head drum and another motor for driving a capstan and a reel.

FIGS. 1A and 1B illustrate a power transmission system of the conventional VCR equipped with motors thus described. FIG. 1A is a plan view and FIG. 1B is a left side view with certain elements removed for clarity.

In FIGS. 1A and 1B, a drum motor 82 drives a head drum 80 and a capstan motor 92 drives a capstan 90 for transporting a magnetic tape 85. Power is transmitted from the capstan motor 92 to a supply reel gear 83 or take-up reel gear 84 through a pulley 93, a belt 95, a reel driving pulley 94, a reel driving gear 97, gears 96 and 98 and an idler gear 91.

Idler gear 91 is carried by a bracket 99 which is pivoted on the common axis of gears 96 and 98, whereby idler gear 91 is coupled with gear 98.

Accordingly, when a tape is inserted into a tape cassette deck to thereby perform a reproduction operation (play mode), the tape 85 is pressed against a periphery of the head drum 80 by means of guide posts 78a and 78b to thereby contact the capstan 90 in a known manner. A pinch roller 86 is moved to thereafter press the tape 85 against the capstan 90 in a known manner.

If the capstan motor 92 is driven under a state where the tape 85 closely contacting the capstan 90, as pressed by the pinch roller 86, the capstan 90 rotates counter-clockwise and the pinch roller 86 is rotated clockwise by frictional force to thereby move the tape therebetween. At the same time, pulley 93 installed under the capstan motor 92 also rotates counter-clockwise causing the reel driving pulley 94, coupled to pulley 93 by the belt 95, to rotate counter-clockwise.

The reel driving gear 97 secured on the same shaft with the reel driving pulley 94 also rotates counter-clockwise, and the gears 96 and 98 thus rotate clockwise. When the gears 96 and 98 rotate clockwise, the bracket 99 and the idler gear 91 which are pivotably supported on the axis of the gears 96 and 98 are moved toward a take-up reel 89, and the idler gear 91 is rotated counter-clockwise and placed in engagement with the take-up reel gear 84. If the idler gear 91 rotates counter-clockwise the take-up reel gear 84 rotates clockwise and the take-up reel 89 also rotates clockwise. Accordingly, the tape 85 is transferred from a supply reel 88 and is wound on the take-up reel 89. At the same time, the drum motor 82 rotates to thereby drive the head drum 80 and a head disposed around the head drum reads a signal of the tape 85.

During rewinding of the tape, the capstan motor 92 rotates in an opposite direction from the reproduction operation (clockwise) to thereby transport the tape 85 toward to supply reel 88. During this operation, the reel driving gear 97 secured on the same axis with the reel driving pulley 94 rotates clockwise whereas the gears 96 and 98 rotate counter-clockwise. When the gears 96 and 98 rotate counter-clockwise, the bracket 99 carrying idler gear 91 moves toward the supply reel 8, and the idler gear 91 is meshed with supply reel gear 83 and rotates clockwise. If the idler gear 91 rotates clockwise, the supply reel gear 83 rotates counter-clockwise and the supply reel 88 also rotates counter-clockwise. Accordingly, the tape 85 is wound on the supply reel 88.

However, the conventional tape transport apparatus thus described requires a drum motor for driving the head drum and a capstan motor for transporting the tape. Accordingly, power consumption is increased considerably and the assembly of the VCR is complicated because of the use of plural motors. Also the number of parts is high resulting in an increased cost.

SUMMARY OF THE INVENTION

Accordingly, it is an object of the present invention to solve the aforesaid problems by employing one motor for driving both the head drum and the tape transport to thereby reduce the power consumption, and at the same time, to simplify the assembling work of the VCR, to increase the yield of the product and decrease the cost.

In order to achieve this object, the present invention provides a head drum and tape driving device of a video tape recorder, the device comprising: a supply reel/take-up reel for supplying a data-recordable tape and winding up the same; a head drum where a head is disposed for recording and/or reproducing data on or from the tape; a motor for driving the head drum; a first power transmission means for transferring driving power from the motor to a tape transport unit; and a second power transmission means for selectively transferring power from the tape transport means to the supply reel or the take-up reel.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE PREFERRED EMBODIMENTS

Hereinafter, the head drum and tape driving device of the VCR will be described with reference to the accompanying drawings.

Figure 1A:
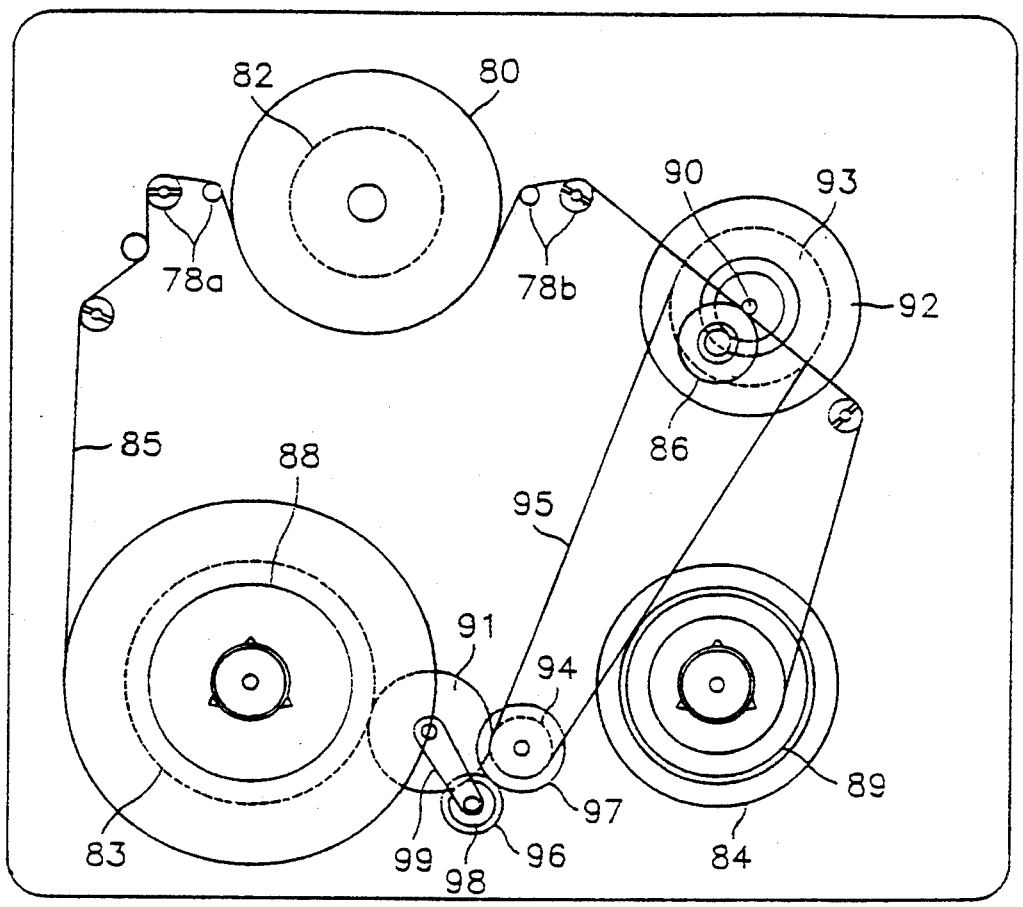
FIGS. 1A and 1B are respectively a plan view and a side view in section of a power transmission system of a conventional VCR equipped with separate motors.
Figure 1B:
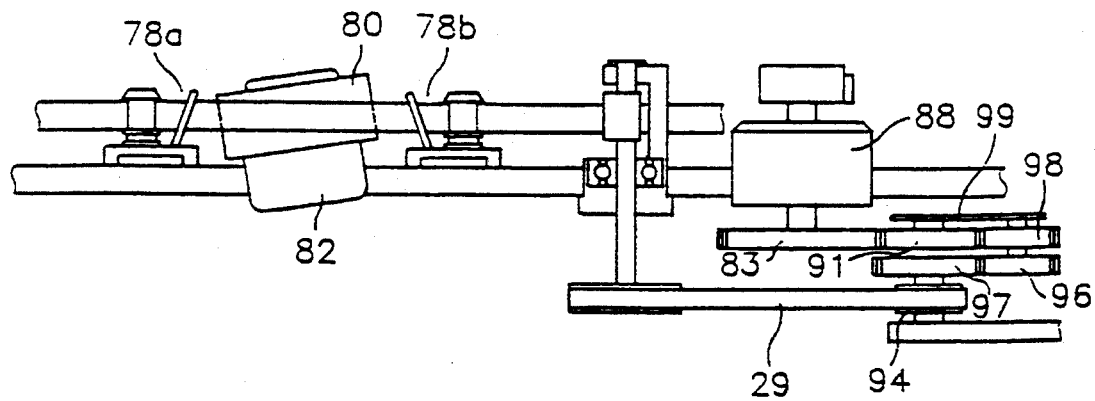
Figure 2A:
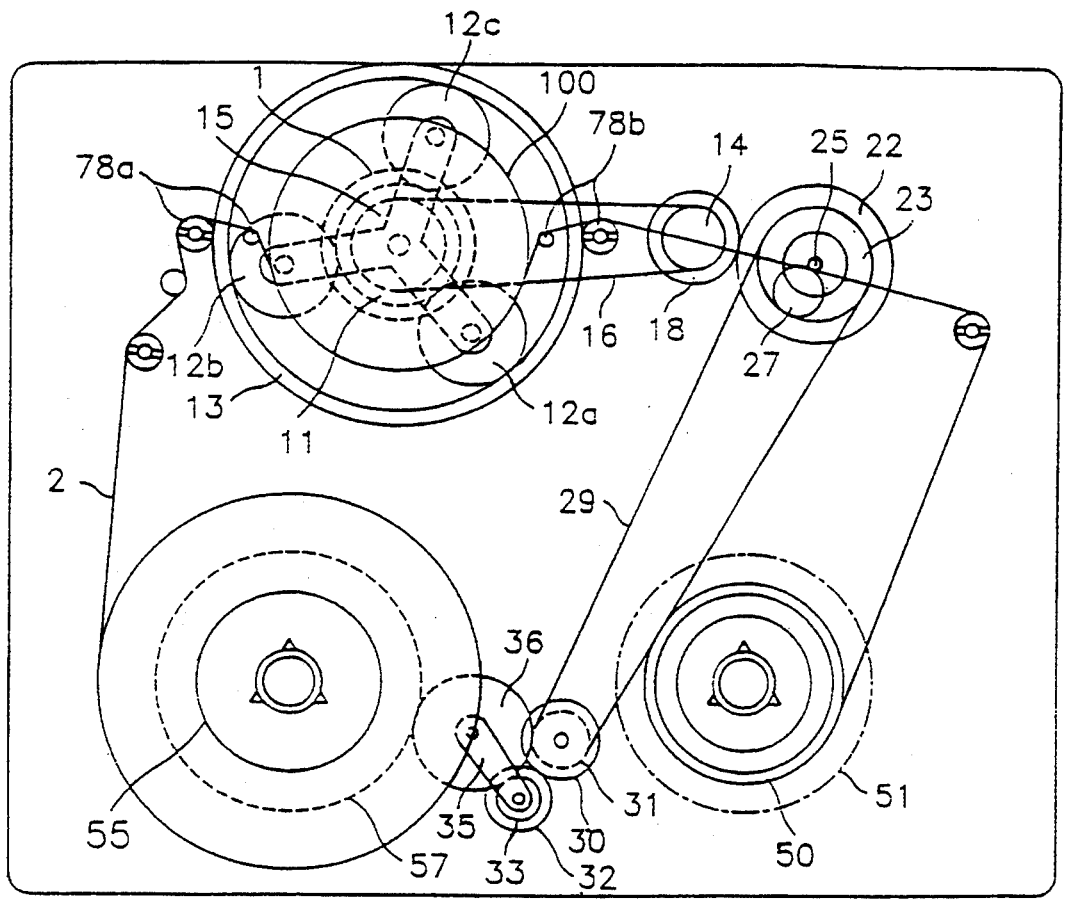
FIGS. 2A and 2B are respectively a plan view and a side view in section of a power transmission system of a VCR in accordance with a preferred embodiment of the present invention.
Figure 2B:
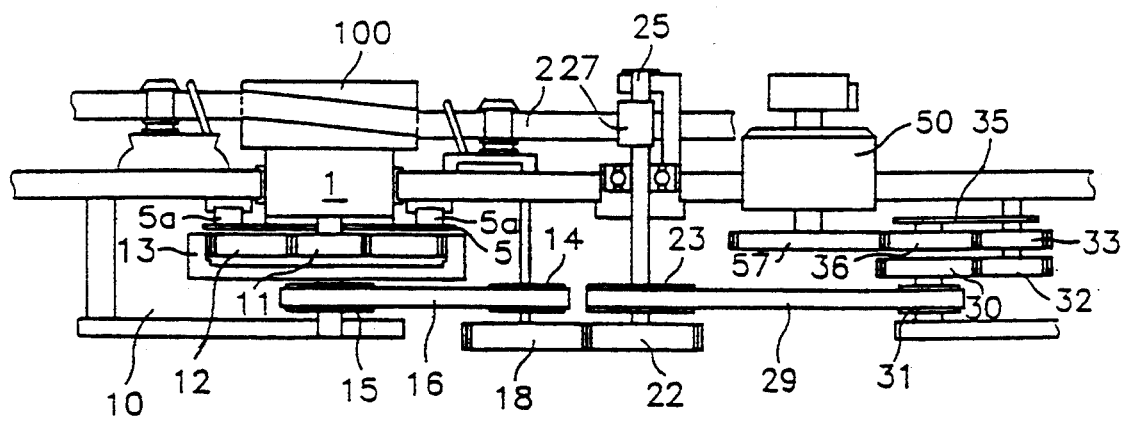

FIGS. 2A and 2B illustrate a power transmission system of a VCR in accordance with the first preferred embodiment. A supply reel 55 and a take-up reel 50 are provided for supplying a data-recordable tape 2 and winding up the same. A head drum 100 has a head disposed thereon for recording and/or reproducing data on or from the tape. A motor 1 drives the head drum 100 and a first power transmission means is provided for transferring power from a tape transport unit to the supply reel 55 or the take-up reel 50.

A construction wherein the head drum 10 is vertically disposed is disclosed in U.S. Pat. No. 4,620,245 entitled, "Tape Loading Apparatus for Use in a Recording and/or Reproducing Apparatus of the Rotating Head Kind" the disclosure of which is hereby incorporated herein by reference thereto. Such a head drum is disposed vertically on a sash, and the tape is spirally wound on the head drum by way of a stepped pulley or guide rails installed on both sides of the head drum. Details of the construction of this type of head drum and a tape loading apparatus are omitted for the sake of brevity.

The tape transport unit includes a capstan gear 22 which is rotated in response to rotation of the motor 1 by way of the first power transmission means, a capstan 25 which rotates due to engagement with the capstan gear 22, and a pinch roller 27 which is pressed toward the capstan 25 to thereby transfer the tape 2. The first power transmission means includes a speed reduction means for reducing a rotating velocity of the motor 1 for driving the head drum 100, a pulley 14 coupled to the speed reduction means through a belt 16, and a gear 18 coupled to the pulley 14 to thereby drive the capstan gear 22 of the tape transport unit.

The speed reduction means of the first power transmission means includes, a sun gear 11 rotated by the motor 1, a plurality of planetary gears 12a, 12b and 12c fixedly secured by a spider link 5 around the sun gear 11, and a rim gear 13 having a gear formed on an inner periphery thereof which is engaged with the planetary gears 12a, 12b and 12c. The tape transport unit of the second power transmission means includes a capstan pulley 23 being mounted coaxially with the capstan gear 22 to be rotated with capstan gear 22, a reel driving pulley 31 coupled to the capstan pulley 23 through a belt 29, a reel driving gear 30 mounted coaxially with the reel driving pulley 31 to be rotated thereby, a plurality of intermediate gears 32 and 33 engaged with the reel driving gear 30 and an idler gear 36 pivotably supported by bracket 35 and engaged with gears 32 and 33 to be rotated thereby.

In the above-mentioned construction, when the tape cassette is inserted into a deck to thereby perform a reproduction operation, the tape 2 is wrapped around a periphery of the head drum 100 by way of guide posts 78a and 78b to thereby contact the capstan 25. Then, when the motor is driven, the head drum 100 mounted thereupon rotates counter-clockwise to thereby read a signal from the tape. At the same time, the sun gear 11 connected to the motor 1 is also rotated counter-clockwise, so that the plurality of planetary gears 12a, 12b and 12c which are engaged with the sun gear 11, rotate clockwise.

In this state, because the spider link 5 coupled with the planetary gears 12a, 12b and 12c and the sun gear 11 is in a fixed state, the planetary gears 12a, 12b and 12c are rotated at a reduced velocity in proportion to the ratio of the number of teeth of the sun gear 11 to that of the planetary gears 12a, 12b and 12c. Furthermore, the rim gear 13 rotates clockwise at a reduced velocity in proportion to the ratio of the number of teeth of the planetary gears 12a, 12b and 12c to that of the rim gear 13. If the rim gear 13 rotates clockwise at the reduced velocity, the pulley 15 integrally formed with the rim gear 13 also rotates clockwise.

When the pulley 15 rotates clockwise, a power transmission pulley 14, connected thereto by a belt 16, also rotates clockwise. When the power transmission pulley 14 rotates clockwise, a capstan driving gear 18 integrally formed with the power transmission pulley 14 rotates clockwise. When the capstan driving gear 18 rotates clockwise, the capstan gear 22 rotates counter-clockwise. Accordingly, the capstan 24 is rotated to thereby transport the tape 2 which is pinched thereagainst by the pressing force from the pinch roller 27.

In this state, the capstan pulley 23 integrally formed with the capstan gear 22 also rotates counter-clockwise and the reel driving pulley 31 connected to the capstan pulley 23 via the belt 29 thus rotates counter-clockwise. When the reel driving pulley 31 rotates counter-clockwise, the reel driving gear 30 mounted on the rotation axis of the pulley 31 rotates counter-clockwise therewith and the gear 32 meshed with the reel driving gear 30 rotates clockwise, and the gear 33 fixedly to the gear 32 rotates clockwise therewith.

When the gear 33 rotates clockwise, the pivoted bracket 35 carrying idler gear 36 travels toward the take-up reel 50 to thereby engage idler gear 36 with the take-up reel gear 51. Accordingly, the idler gear 36 is rotated counter-clockwise by the gear 33 rotating clockwise, and the take-up reel gear 51 and the take-up reel 50 rotate clockwise to thereby wind up the tape 2.

In a high speed search mode and a high speed winding mode, the rotating velocity of the motor 1 is increased, so that the capstan 25 and the take-up reel 50 are rotated at a high speed in proportion to the velocity of the motor to thereby wind up the tape 2 on the take-up reel 50. In a rewind mode, if the motor 1 is rotated in a reverse direction which is opposite from the direction of rotation during the reproduction mode, high speed search mode, high speed winding mode or the like thus described, a driving direction of the tape transport unit is reversed. In this mode, the capstan is rotated clockwise and the reel driving pulley 31 and reel driving gear 30 also rotate clockwise. Meanwhile the gears 32 and 33 are rotated counter-clockwise to thereby move the idler gear 36 toward the supply reel 55 (See FIG. 2A) causing the supply reel gear 57 to be driven and the tape 2 to wind onto the supply reel 55 from the take-up reel 50.

Figure 3:
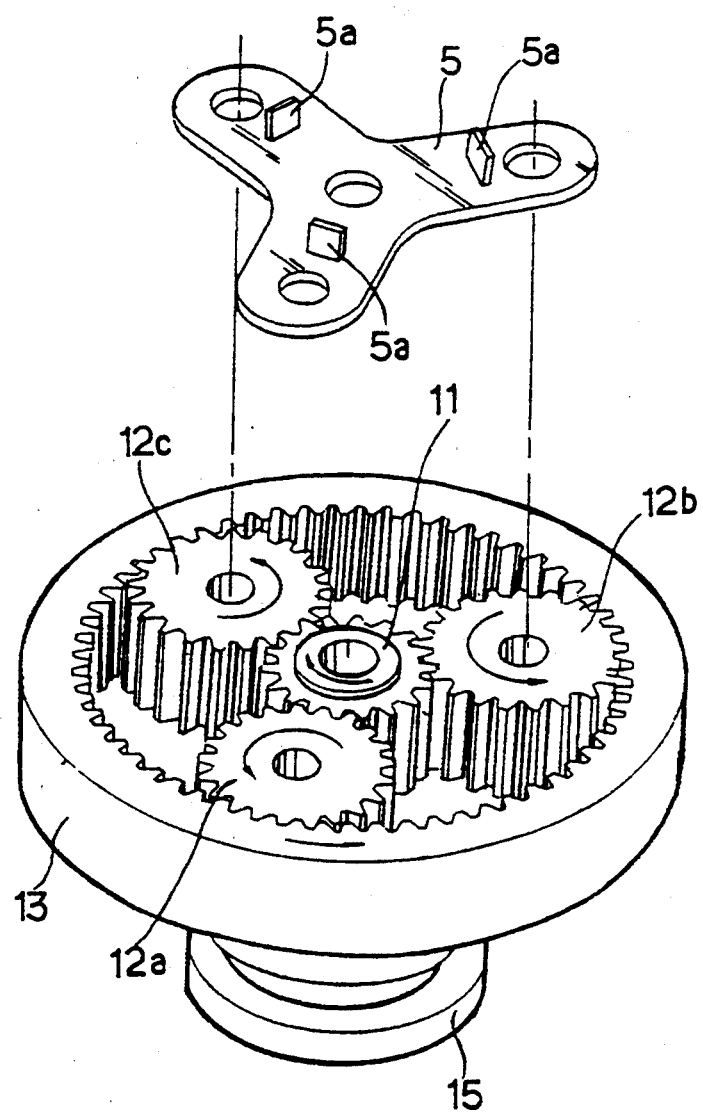
FIG. 3 is a perspective view illustrating a speed reduction device of the preferred embodiment.

FIG. 3 illustrates the speed reduction means of the first power transmission means shown in FIGS. 2A and 2B. The speed reduction means includes the sun gear 11 secured to be rotated by the motor 1, a plurality of planetary gears 12a, 12b and 12c carried by the spider link 5 for being rotated by the sun gear 11, and the rim gear 13 having a gear formed on the inner periphery thereof for being rotated in an engaged relation with the planetary gears 12a, 12b and 12c. The pulley 15 is formed below the rim gear 13.

In the construction thus described, projections 5a formed on the spider link 5 engage with a sash of the deck to fixedly secure the link 5 to the sash of the deck. Accordingly, the sun gear 11 is rotated by the motor 1 to thereby reduced the velocity of the planetary gears 12a, 12b and 12c in proportion to the ratio of the number of teeth respectively, and to thereby engaged with the gear formed on the inner surface of the rim gear 13. The rim gear 13 is thus rotated at a reduced velocity in proportion to the ratio number of teeth of the planetary gears 12a, 12b and 12c to that of the rim gear 13. The rim gear 13 has the pulley 15 thereunder and the pulley 15, as illustrated in FIGS. 2A and 2B. Belt 16 transfers the power of the motor 1 to the capstan shaft.

It should be understood that the number of teeth shown on the sun gear 11, planetary gears 12a, 12b and 12c and rim gear 13 illustrated in FIG. 3 is not necessarily accurate but these numbers may be easily determined, in accordance with the desired speed reduction, by one of ordinary skill.

Figure 4A:
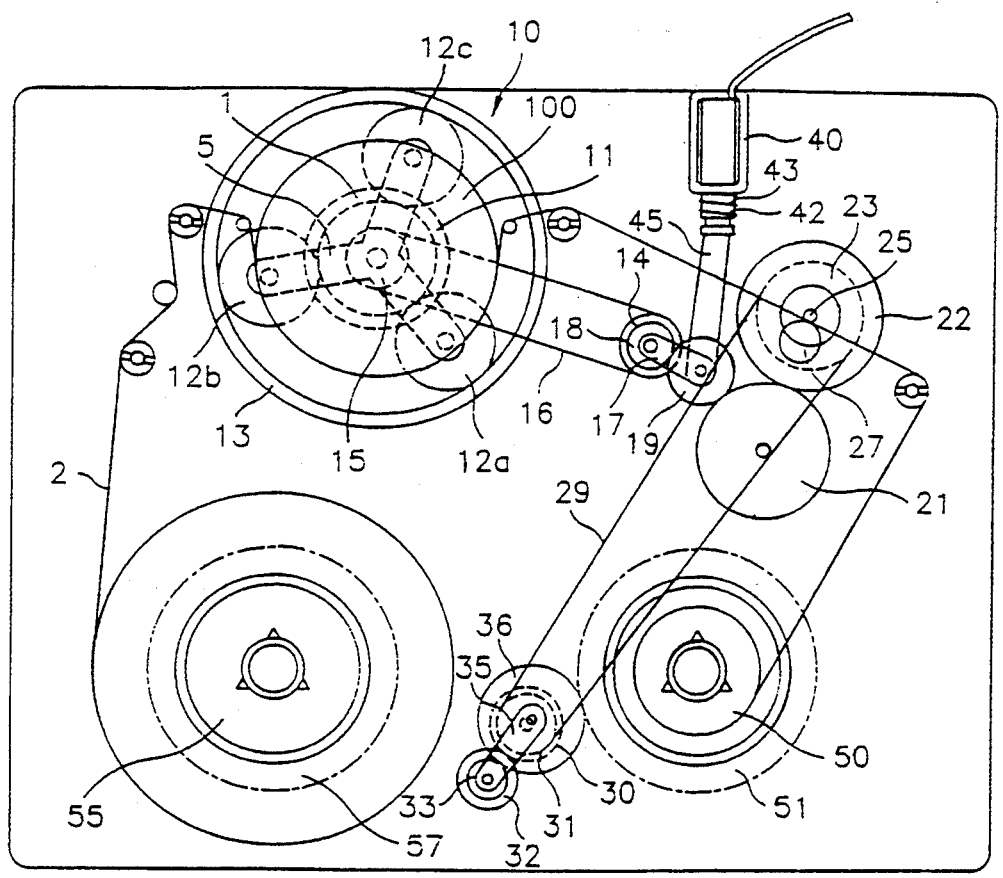
FIGS. 4A and 4B illustrate a plan view and a side view in section respectively of a power transmission system of another preferred embodiment of the present invention.
Figure 4B:
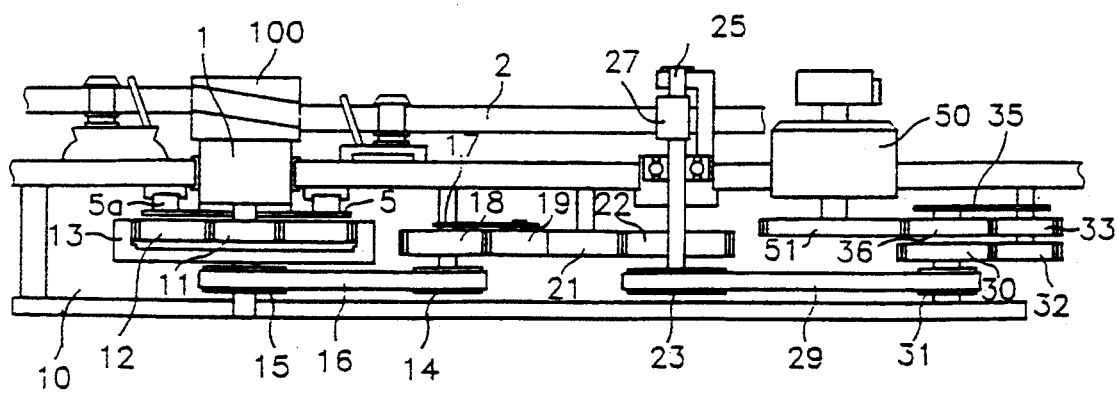

FIGS. 4A and 4B illustrate a power transmission means of a second embodiment of the present invention. A direction change means for changing a transfer direction of the tape 2 is interposed between the first power transmission means and the tape transport unit. The direction change means has an idler gear 19 pivotably mounted by a bracket 17 for being engaged with a capstan driving gear 18 of the first power transmission means, a direction change gear 21 for being engaged with the capstan gear 22 of the tape transport unit, and a driving means for causing the idler gear 19 to selectively mesh with the direction change gear 21 or capstan gear 22 to thereby change the driving direction of the tape transport unit.

The driving means includes a solenoid 40 having a plunger 42 is protruded by the resilience of a spring 43 and which can be retracted under the application of electrical power to the solenoid, and a lever 45 for connecting the plunger 42 of the solenoid to the bracket 17 of the idler gear 19. Explanation of other construction details of this embodiment will be omitted as they are similar to the embodiment described above with reference to FIGS. 2A and 2B.

In the head drum and tape driving device of the VTR thus constructed, if the play mode operation is performed, the motor driving the head drum 100 operates but the solenoid does not operate. When the solenoid 40 is not operated (energized), the plunger 42 is protruded from the solenoid 40 by the resilience of the spring 43 to thereby push the lever 45. When the lever 45 is pushed by the plunger 42, the idler gear 19 meshed with the capstan driving gear 18 by the bracket 17 linking the two is then meshed into the direction change gear 21. Under a state thus described, the head drum 100 mounted on the motor 1 is rotated counter-clockwise by the motor 1 to thereby read the signal of the tape.

At the same time, because the sun gear 11 connected to the motor 1 rotates counter-clockwise, the planetary gears 12a, 12 b and 12c engaged with the sun gear 11 are rotated clockwise. The rim gear 13 is rotated clockwise by the planetary gears 12a, 12b and 12c and the pulley 15 integrally formed with the rim gear 13 is also rotated clockwise.

When the pulley 14 rotates clockwise, the power transmission pulley 14, connected therewith by the belt 16, rotates clockwise, and the capstan driving gear 18 integrally formed with the power transmission pulley 14 is also rotated clockwise. When the capstan driving gear 18 rotates clockwise, the idler gear 19 is rotated counter-clockwise while the direction change gear 21 rotates clockwise. If the direction change gear 21 rotates clockwise, the capstan gear 22 is rotated counter-clockwise. Accordingly, the capstan 25 is rotated to thereby transport the tape 2 which is pinched thereagainst by the pressing force of the pinch roller 27.

Concurrently, a pulley 23 mounted to rotate together with capstan gear 22 is also rotated counter-clockwise to thereby rotate counter-clockwise a pulley 31 connected to the pulley 23 by a belt 29. When the pulley 31 is rotated counter-clockwise, a reel driving gear 30 secured to rotate together with the pulley 31 is rotated counter-clockwise. Accordingly, the gear 32 engaged with the reel driving gear 30 is rotated clockwise to thereby rotate clockwise the gear 33 which is mounted to rotate together with the gear 32.

When the gear 33 is rotated clockwise, a pivoted bracket 35 travels toward the take-up reel 50, so that an idler gear 36 engaged with gear 33 and carried by bracket 35 can engage with the take-up reel gear 51. Therefore, the idler gear 31 is rotated counter-clockwise by the gear 33 rotating clockwise, causing the take-up reel gear 51 and take-up reel 50 to rotate clockwise and to wind up the tape 2.

In the high speed search mode, the high speed winding mode and the like, the rotating velocity of the motor 1 is increased to thereby rotate the capstan 25 and the take-up reel 50 at a high speed in proportion to the rotating velocity of the motor 1, so that the tape 2 is wound up toward the take-up reel 50. Meanwhile, the solenoid 40 is operated during a review mode, and when the solenoid 40 operates, the plunger 42 is pulled-in. When the plunger 42 is pulled-in, the lever 45 is also pulled to thereby engage the idler gear 19 with the capstan gear 22.

In this state, the motor 1 is rotated counter-clockwise as in the play mode operation to thereby drive the head drum 100, so that the signal on the tape 2 is read by the head installed on the head drum 100. At the same time, the sun gear 11 connected to the lower shaft of the motor 1 is rotated counter-clockwise to thereby rotate clockwise the planetary gears 12a, 12 b and 12c meshed with the sun gear 11. The rim gear 13 is thus rotated clockwise by the planetary gears 12a, 12 b and 12c to thereby rotate the pulley 15 integrally formed with the rim gear 13 clockwise.

When the pulley 15 is rotated clockwise, the power transmission pulley 14 connected therewith by the belt 16 is rotated clockwise, and the capstan driving gear 18 rotating together with the power transmission pulley 14 also rotates clockwise. Accordingly, the idler gear 19 rotates counter-clockwise while the capstan gear 22 engaged with the idler gear 19 rotates clockwise. When the capstan gear 22 rotates clockwise, the capstan 25 rotates to thereby transport the tape 2 in the reverse direction by means of the pressing force of the pinch roller 27.

Concurrently, the pulley 23 rotating together with the capstan gear 22 also rotates clockwise and the pulley 31 connected to the pulley 23 by the belt 29 in turn rotates clockwise. When the pulley 31 rotates clockwise, the reel driving gear 30 rotating together with the pulley 31 also rotates clockwise. Thus, the gear 32 meshed with the reel driving gear 30 rotates counter-clockwise, and likewise, the gear 33 rotating together with the gear 32 rotates counter-clockwise.

When the gear 33 rotates counter-clockwise, the bracket 35 travels toward the supply reel 55 to thereby engage the idler gear 36 with a supply reel gear 57. Accordingly, the idler gear 36 is rotated clockwise by the gear 33 rotating counter-clockwise, and the supply reel gear 57 and supply reel 55 rotate counter-clockwise to thereby wind up the tape 2.

In a rewind mode operation, after the tape is inserted, and under a state where a tape loading operation is not performed, the same operation as in the review mode is executed. Therefore, the idler gear 36 rotates the supply reel gear 57, causing the tape 2 to be wound onto the supply reel 55.

Figure 5A:
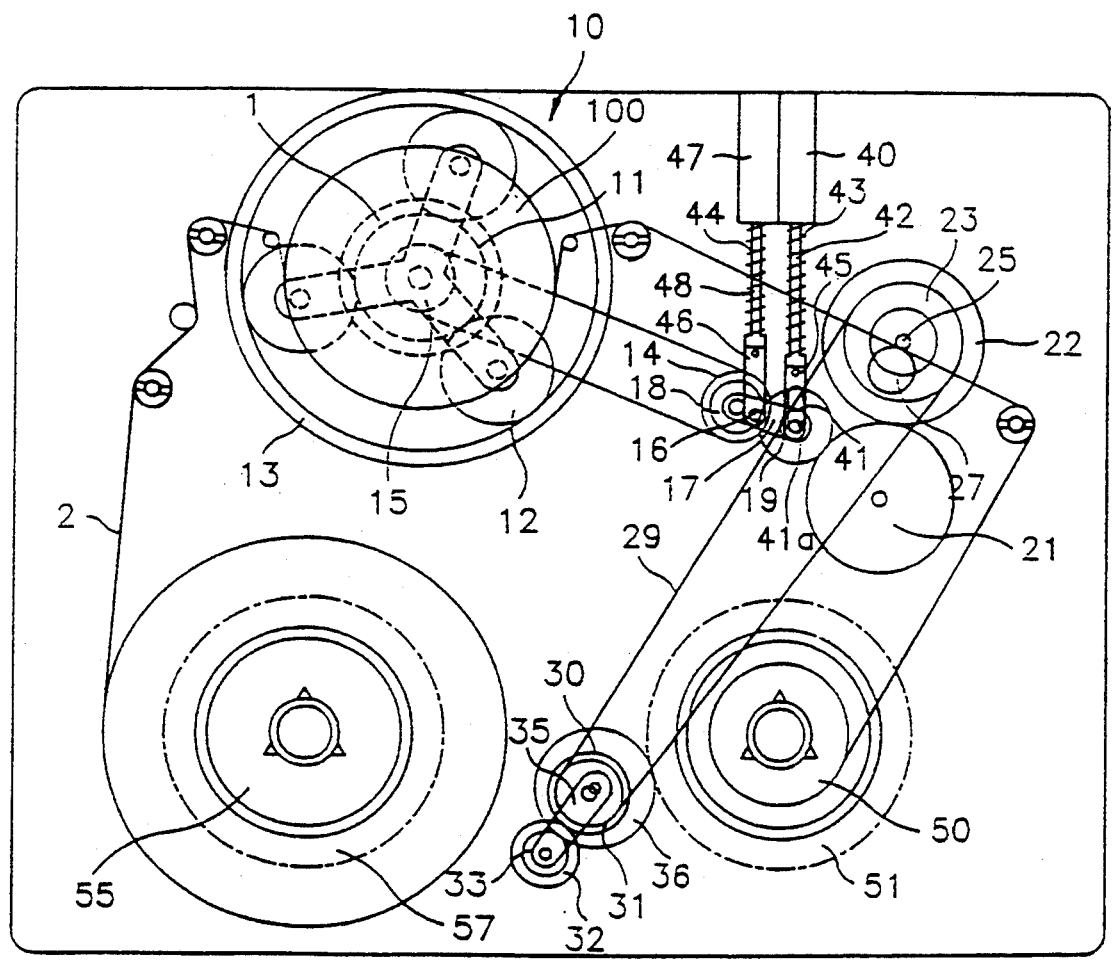
FIGS. 5A, 5B and 5C illustrate a power transmission system of another preferred embodiment of the present invention.
Figure 5B:
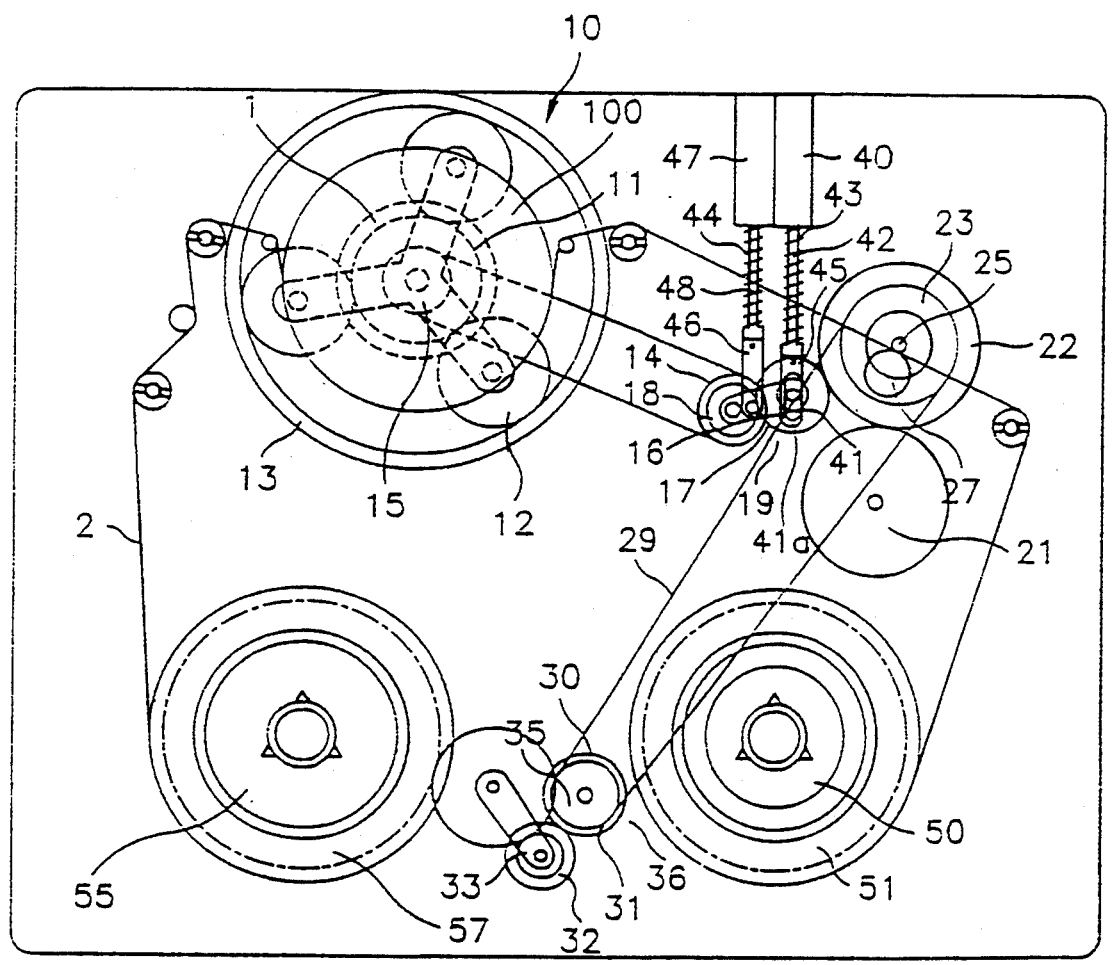
Figure 5C:
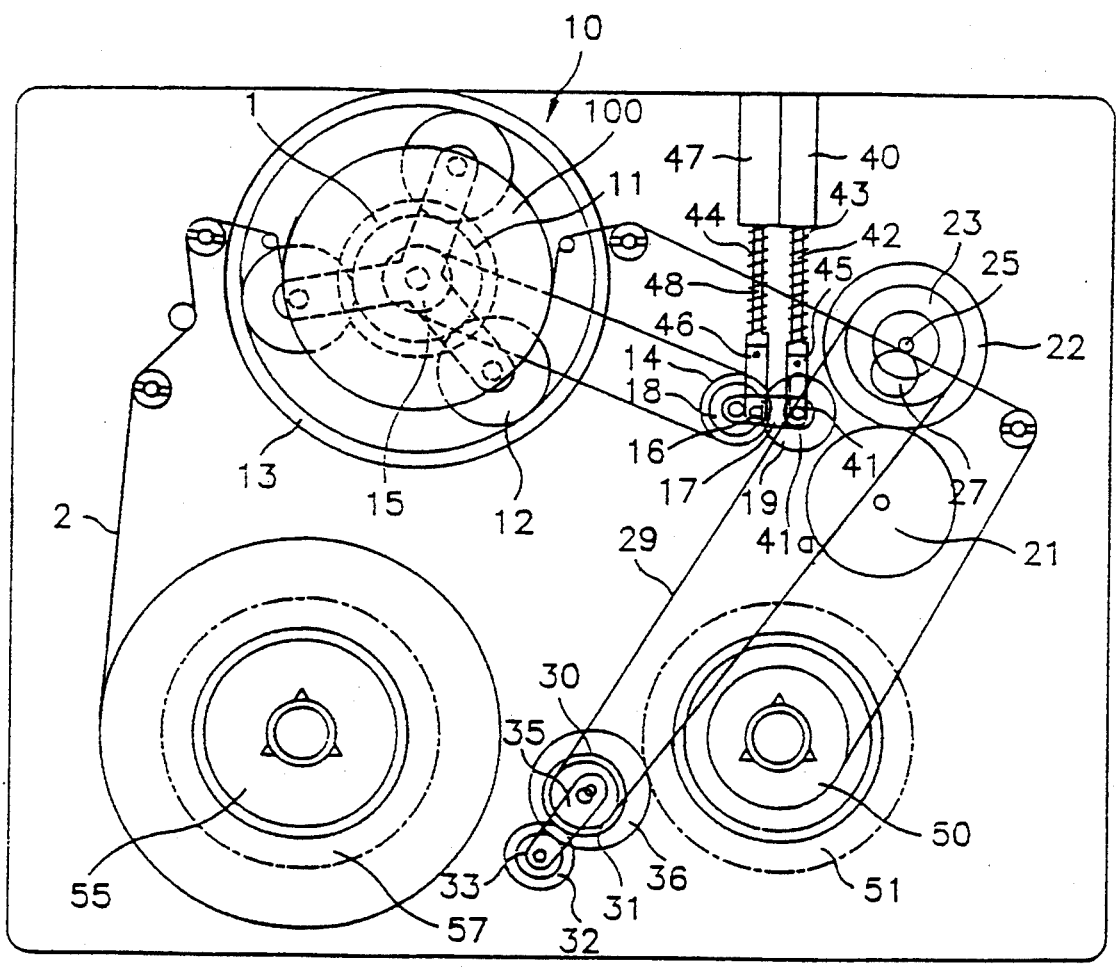

FIGS. 5A, 5B and 5C illustrate a power transmission system of still another embodiment of the present invention. A driving means of a direction change means includes the two solenoids 40 and 47. Respective longitudinal ends of levers 45 and 46 connected to respective plungers 42 and 48 of the solenoid 40 and 47 are pivotably connected to a bracket 17. The other end of the lever 45 connected to the plunger 42 of the solenoid 40 has an oblong groove 41 formed therein. An axis 41a of the idler gear 19 is rotatably mounted within the groove 41 formed on the lever 45. Other construction details are similar to the embodiments explained above with reference to FIGS. 4A and 4B, and thus detailed description thereof will be omitted.

In a head drum and tape driving device of the VTR thus constructed, if the play mode operation is performed, as illustrated in FIG. 5A, the motor driving the head drum 100 is operated but the solenoids 40 and 47 are not operated (energized). When the solenoids 40 and 47 are not operated, plungers 42 and 48 remain in a protruded due to the resilience of springs 43 and 44 to thereby push the levers 45 and 46 outwardly. Accordingly, the idler gear 19 is engage with change gear 21.

The operation of this embodiment for the play mode is similar to that described with reference to FIGS. 4A and 4B, and thus further explanation will be omitted.

In the high speed search mode, high speed winding mode and the like, the rotating velocity of the motor 1 is increased to thereby rotate the capstan 25 and the take-up reel 50 at a high speed in proportion to the rotating velocity of the motor 1, so that the tape 2 is wound up toward the take-up reel 50.

In the review mode operation, the solenoid 47 is operated as illustrated in FIG. 5B. When the solenoid 47 is operated, the plunger 48 is pulled-in. In this state, the lever 46 is pulled in to thereby engage the idler gear 19 with the capstan gear 22. At this location, the axis 41a of the idler gear 19 travels into an inner end of the oblong groove 41 formed in the lever 45. Other operations of this embodiment are the same as in the embodiment illustrated in FIGS. 4A and 4B and thus detailed description thereof will be omitted.

During the rewind mode operation, after the tape is inserted, the same operation as in the review mode is performed under a state where the loading tape operation is not executed. Accordingly, the idler gear 36 rotates the supply reel gear 57, so that the tape 2 can be wound onto the supply reel 55.

Furthermore, the solenoid 40 is activated as illustrated in FIG. 5C during a pause mode (and still mode) while the other solenoid 47 is de-activated. In this case, because a point of action for the solenoid 40 is located far away from the axis 18 of capstan driving pulley 14 and capstan driving gear 18, even though the solenoid 40 is operated, the idler gear 19 does not engage with either the direction change gear 21 or the capstan gear 22. Therefore, even though the head drum is driven, the capstan 25 and the reels 50 and 55 are not driven. Accordingly, the tape 2 is not transported and the head drum 100 is operated by the motor 1 to thereby perform the pause (or still) mode operation. Furthermore, the aforementioned operation can also be performed by respectively predetermining different operational lengths of the plungers 42 and 48 for the solenoids 40 and 47.

As seen from the foregoing, according to the present invention, the head drum and the tape transport are both driven by the same motor to thereby reduce power consumption, simplify the assembly of the VCR, and reduce the size of the VCR.

The present invention is not limited to the above-mentioned preferred embodiments of the drum and tape driving device, but many modifications and changes can be made therein without departing from the spirit and scope of the invention as defined by the appended claims.

Specifically, although the embodiments use gears and belts, it will be understood by one of ordinary skill in the art that various alternative power transmission means and arrangements can be employed. Also, the number of gears and solenoids employed can be increased or decreased as desired.

What is claimed is:

1. A head drum and tape transport driving device for a video tape recorder comprising:
    a supply reel and a take-up reel for supplying a data-recordable tape and winding up the same;
    a head drum having a head disposed thereon for recording and/or reproducing data on or from the tape;
    a motor for driving the head drum;
    tape transport means for transporting the tape past the head drum;
    first power transmission means for transferring driving power from the motor to the tape transport means; and
    second power transmission means for selectively transferring driving power from the tape transport means to at least one of the supply reel and the take-up reel.

2. A head drum and tape transport driving device for a video tape recorder as defined in claim 1, wherein the tape transport means comprises:
    a capstan gear coupled to the motor by the first power transmission means;
    capstan means coupled to the capstan gear; and
    a pinch roller disposed in opposition to the capstan to thereby transport the tape therebetween.

3. A head drum and tape transport driving device for a video tape recorder as defined in claim 2, wherein the first power transmission means comprises:
    speed reduction means for reducing a rotating velocity of the motor;
    pulley means coupled to the speed reduction means through a belt; and
    first gear means coupled to pulley means to thereby drive the capstan gear of the tape transport means.

4. A head drum and tape transport driving device for the video tape recorder as defined in claim 3, wherein the speed reduction means comprises:
    a sun gear fixedly secured on a shaft of the motor for being rotated thereby;
    a plurality of planetary gears engaged with the sun gear to thereby be rotated by the sun gear; and
    a rim gear having a gear formed on an inner peripheral surface thereof which is engaged with the planetary gears.

5. A head drum and tape transport driving device for a video tape recorder as defined in claim 1, wherein the second power transmission means comprises:

a pulley coaxially fixed to the capstan gear to thereby be rotated together with the capstan gear;

a reel driving pulley coupled to the pulley means through a belt;

a reel driving gear coaxially fixed on the reel driving pulley for being rotated therewith;

second gear means for being rotated under an engaged relation with the reel driving gear; and idler gear means pivotally supported by a pivoted bracket for being rotated through engagement with the second gear means.

6. A head drum and tape transport driving device for a video tape recorder comprising:

a supply reel and a take-up reel for supplying a data-recordable tape and winding up the same;

tape transport means for transporting the tape past the head drum;

a head drum having a head disposed thereon for recording and/or reproducing data on or from the tape;

a motor for rotatably driving the head drum;

first power transmission means for transferring the power of the motor to the tape transport means;

direction change means for changing a power transmission route of the first power transmission means to thereby change a travel direction of the tape transport by the tape transport means; and second power transmission means for selectively transferring the power of the tape transport means to at least one of the supply reel and the take-up reel.

7. A head drum and tape transport driving device for a video tape recorder as defined in claim 6, wherein the tape transport means comprises:

a capstan gear coupled to the motor by way of the first power transmission means;

a capstan coupled to the capstan gear; and a pinch roller disposed in opposition to the capstan to thereby transfer the tape.

8. A head drum and tape transport driving device for a video tape recorder as defined in claim 6, wherein the first power transmission means comprises:

speed reduction means for reducing the rotating velocity of the motor for driving the head drum;

a pulley coupled to the reduction means through a belt; and a gear coupled to the pulley to thereby drive the capstan gear of the tape transport means.

9. A head drum and tape transport driving device for a video tape recorder as defined in claim 8, wherein the speed reduction means comprises:

a sun gear fixedly secured to the motor;

a plurality of planetary gears engaged with the sun gear to thereby be rotated by the sun gear; and a rim having a gear formed on an inner surface thereof which is with the planetary gears.

10. A head drum and tape transport driving device for a video tape recorder as defined in claim 6, wherein the direction change means comprises:

idler gear means for being selectively engaged with a capstan driving gear of the first power transmission means;

a direction change gear engaged with the capstan gear of the tape transport means; and moving means for moving the idler gear to thereby control a travelling state of the tape.

11. A head drum and tape transport driving device for a video tape recorder as defined in claim 10, wherein the driving means comprises:

a solenoid having a plunger, said plunger being biased outward by the resilience of a spring, said plunger being pulled into said solenoid under the application of power to said solenoid according to an operation mode of said device; and a lever connecting the plunger of the solenoid to the idler gear, so that the idler gear is selectively engaged with one of the direction change gear and the capstan gear to thereby change the running direction of the tape.

12. A head drum and tape transport driving device for a video tape recorder as defined in claim 10, wherein the driving means comprises:

a pair of solenoids each having a plunger which is biased outward by the resilience of respective springs, said plungers being pulled into said solenoids under the application of power supplied to the solenoids according to an operation mode; and a lever connecting the plunger of the solenoid to the idler gear, whereby the idler gear may be selectively engaged with one of the direction change gear and the capstan gear, disengaged therefrom such that power transfer to the tape transport means may be prevented.

13. A head drum and tape transport driving device for a video tape recorder as defined in claim 12, wherein an end of the lever which is connected to the plunger of the solenoid has an oblong groove formed therein carrying an axis of the idler gear rotatably therewithin.

14. A head drum and tape transport driving device for a video tape recorder as defined in claim 6, wherein the second power transmission means comprises:

a pulley coaxially mounted with the capstan gear to rotate therewith;

a reel driving pulley coupled to the pulley through a belt;

a reel driving gear coaxially mounted on the reel driving pulley;

intermediate gear means for rotating due to engagement with the reel driving gear; and an idler gear pivotally supported by a bracket engaged with the intermediate gear means.

* * * * *